July 7, 1970  IWAO KAWAKAMI  3,519,638
4,5-DIPHENYLIMIDAZOLE DERIVATIVE
Filed Sept. 19, 1967
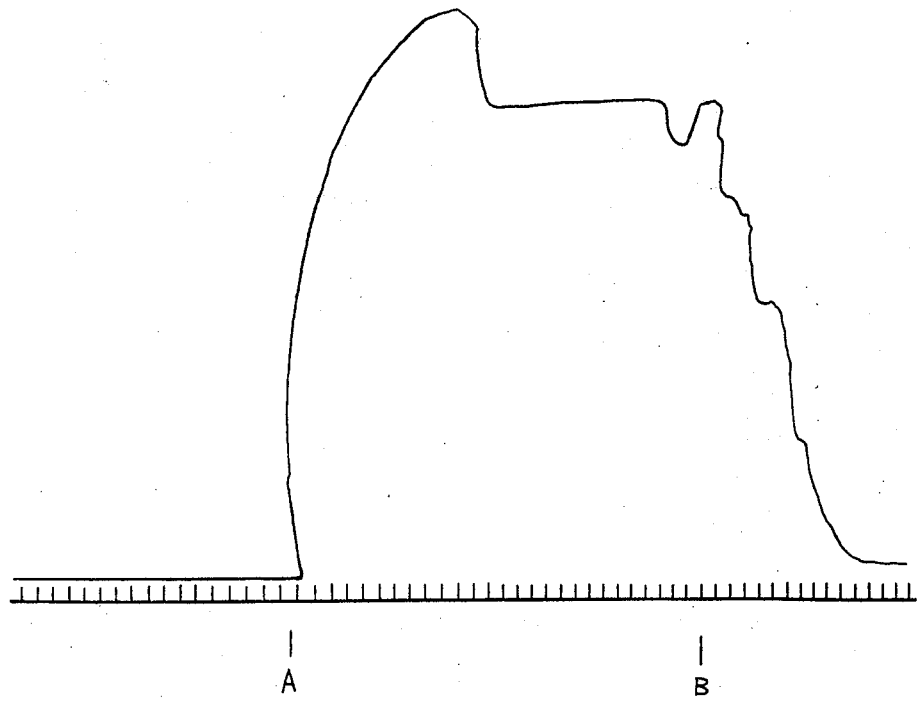
INVENTOR
Iwao Kawakami
BY *cchandleePidgeon*
AGENT

United States Patent Office 3,519,638
Patented July 7, 1970

3,519,638
4,5-DIPHENYLIMIDAZOLE DERIVATIVE
Iwao Kawakami, 609 Kugayama-heim, 492–7 2-chome,
Kugayama, Suginami-ku, Tokyo, Japan
Filed Sept. 19, 1967, Ser. No. 673,244
Claims priority, application Japan, Sept. 3, 1965,
40/53,904
Int. Cl. C07d 49/36
U.S. Cl. 260—309     1 Claim

ABSTRACT OF THE DISCLOSURE 4,5 diphenylimidazole is reacted with an easily soluble propylene oxide or a derivative of butylene oxide or a 1-halogenol-2-hydroxy compound in the presence of a tertiary amine to produce dl - 1-(4'-diphenylimidazolyl)-2-propanol or dl - 1 - (4',5'-diphenylimidazolyl)-2-ethyl-2-propanol. These compounds are used as the fundamental material in ointments and fluids for dermatitis and in cosmetics.

---

This invention relates to certain 4,5-diphenylimidazole derivatives and methods of manufacture thereof. These new compounds will be denoted generally as follows:

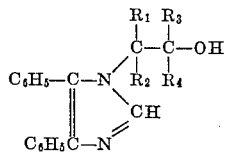

wherein $R_1 = H$, $CH_3$ or $C_2H_5$
$R_2 = H$, $CH_3$ or $C_2H_5$
$R_3 = H$, $CH_3$, $C_2H_5$ or $CH(CH_3)_2$
$R_4 — H$, $CH_3$ or $C_2H_5$ These new materials have strong anti-allergic action and exert dilating action on capillary vessels and contractive action over a long period. Furthermore, they are easily dissolved in hot petroleum jelly, liquid paraffin, glycerin and Carbowax and can also be dissolved in them when cold, which indicates that they have good solubility, so they may be added efficiently to suitable drugs, in which the above-mentioned compounds are used as the fundamental material, for example, ointments and fluids for dermatitis, and cosmetics such as cold cream, face milk lotion, foundation lotion and lipstick. They also have a strong therapeutic action for the asthma of guinea pigs which is caused experimentally by inhalation of dilute histamine solution.

A drug in which this new material is added, for example, an ointment for dermatitis promotes a peripheral circulation of blood rationally, elevates functions of skin and improves absorption of efficient ingredients from the ointment, and at the same time a skin eruption can be speedily healed by the anti-allergic and anti-phlogistic action of the compound. Administration of the material in a plaster or court-plaster does not cause any side reaction when used for a long time. A drug for athlete's foot which contains this new material is effective for a treatment of water-eczema. An amount of addition of this material in a medicament is sufficient at 0.02–1.5% by weight.

Cosmetics containing the said compound promote proper peripheral blood circulation, accordingly elevate functions of skin, maintain youth and beauty and at the same time aid absorption of nourishing components used in the cosmetics and increase skin regulating functions due to their anti-phlogistic action they can prevent dermatitis which damages a beautiful skin and inhibit skin reactions to cosmetics, and they do not cause side effects when used for a long time.

The already known 3,5-diphenylimidazole, hereinafter referred to as DI, possesses only a dilating action of capillary vessels and scarcely any contractile action. Further, as it is almost insoluble in petroleum jelly, liquid paraffin and glycerin, it may be difficult to add it directly to a drug in which the above-mentioned materials are used as base material. For example, an ointment for treatment of dermatitis and a dental cream, or cosmetics, such as cold cream, face milk lotion, foundation lotion and lipstick and in this case it may be a disadvantage since first it must be dissolved in an organic solvent, like alcohol, and then added to the base material.

An object of this invention is the production of the new compound with new medical efficiencies and chemical properties differing from DI and with higher yield.

That is to say, one of the methods of production consists in the reaction of DI with propylene oxide or derivatives of butylene oxide, which reacts easily with water, in the presence of a tertiary amine.

Another method of production of this invention consists in the reaction of DI with 1-bromo-2-propanol or with a 1-halogeno-2-hydroxy compound, which corresponds to derivatives of butylene oxide, in the presence of an alkaline substance.

The accompanying drawing is a single figure showing the pharmacological characteristics of the new material, dl - 1-(4',5-diphenylimidazolyl)-2-propanol, hereinafter referred to as DIPO which is the product of this invention. This figure shows that a strong contraction state of a small living piece of the marmot intestine, which suspended in 200 ml. of Tyrode's solution warmed to 37–38° C. is caused by the addition of 0.1 ml. of an 0.01% bradykinin solution at the point A. The graph further shows that the intestine exhibits a state of strong contraction since the addition of 4 mg. of DIPO at the point B causes the recovery of the intestine to the state before contraction. The figure shows that DIPO does not only reveal an irritating action on mucous membrance, but also reveals a strong antagonizing action against bradykinin.

Bradykinin is a peptide which was discovered by Silva and others of U.S.A. in 1949 in the blood of humans or others. It causes histamine-like physiological actions, that is to say, actions to cause a strong contraction of the marmot's intestine and to maintain the contraction, and at present it is noted to have participation with an allergic reaction.

Propylene oxide or derivatives of butylene oxide, which reacts easily with water, and is used in this invention, is shown in the following general formula:

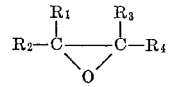

In this formula: $R_1$, $R_2$, $R_3$, and $R_4$ are same as shown above. 1,2-epoxy-2-methylbutane, 1,2-epoxy-2-ethylbutane, 1,2-epoxy-3-methylbutane, 2,3-epoxy-3-methylbutane or 2,3-epoxy-2,3-dimethylbutane are used as representative reagents.

1-bromo-2-propanol or a 1-halogeno-2-hydroxy compound which corresponds to a derivative of butylene oxide has the following general formula:

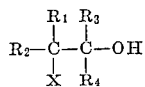

In this formula $R_1$, $R_2$, $R_3$ and $R_4$ are same as shown above, X represents Br or Cl. 1-chloro-2-methyl-2-butanol, 1-chloro-2,5-dimethyl-2-hexanol, butylene chlorhydrin, isobutylenechlorhydrin and pentylene chlorhydrin are used as representative reagents.

As a tertiary amine trimethylamine, triethylamine, tripropylamine, tributylamine, ethyldimethylamine, methyldiethylamine, pyridine, N-methylpiperidine or N-ethylpiperidine are used effectively. The methods of this invention are according to the following procedures:

(I) Propylene oxide or derivatives of butylene oxide, which easily react with water, and of a small amount of a tertiary amine are added to alcohol, to this solution DI is added and heated to weak boiling. After complete dissolving of DI, the solution is brought to room temperature, and DIPO or its derivatives crystallize out. After filtering the crystals, they are washed with dilute alcohol and then dried. As the crystals have a high purity, generally there is no use of further purification. To the filtrate above obtained, add water and let stand; this yields a small amount of crystals. The total amount of crystals reaches 80–85% of the theoretical value.

(II) DI and 1-bromo-2-propenol or 1-halogeno-2-hydroxy compound, which corresponds to a derivative of butylene oxide are mixed with alcohol and a small excess of alkaline solution is added slowy to the halogen compound, with weak boiling, the soltuion is filtered while hot. The filtrate is brought to room temperature and DIPO crystallizes out. The crystals are filtered and dried after washing with dilute alcohol and then water. The crystals have a lower melting point than that of the crystals obtained by the first procedure. Water is added to the filtrate, from which the crystals were separated, and let stand; a smaller amount of crystals is obtained. The total amount of the crystals thus obtained reaches to 65% of the theoretical amount. The crystals thus obtained are used after the further purification.

The following examples demonstrate suitable methods of this invention:

EXAMPLE 1

75 g. of propylene oxide and 5 ml. of pyridine or triethylamine are added to 580 ml. of 94% ethanol and mixed with 220 g. of DI and then boiled weakly in a water bath. The boiling is continued for 1.5 hours with a refluxing condenser. By this boiling DI is dissolved completely. After bringing the reaction solution to room temperature of 20° C. for 10 hours, colorness plate crystals of DIPO crystallize out. The crystals are then filtered in a vacuum filter and after washing them with cold 40% alcohol, they are dried at the room temperature of 20° C. resulting in 223 g. of crystals (A). They have a melting point of 165–166° C. To 500 ml. of the filtrate, obtained in the vacuum filter, 100 ml. of water is added and maintained at room temperature of 20° C. for 10 hours, and 15 g. of the crystals (B) are obtained. The melting point of the crystals (B) is lower than that of the crystals (A). 10 g. of the crystals (A) are mixed with 200 ml. of distilled water and dissolved with addition of 10 ml. of 10% hydrochloric acid. The solution has some turbidity, then 5 g. of decolorizing charcoal is added to the turbid solution which is filtered after thorough shaking. The clear solution thus obtained is made alkaline by the addition of 28% aqueous solution of ammonia and the sediment which occurs is filtered in a vacuum filter and then dried at room temperature of 20° C. The dried material is recrystallized with 80% ethanol and 8 g. of purified crystals are obtained. They have a melting point of 167–168° C. The following is an elementary analysis of the material obtained:

Calculated (percent): C, 77.67; H, 6.52; N, 10.06.
Experimental (percent): C, 77.54; H, 6.41; N, 9.82.
The result is shown as follows:

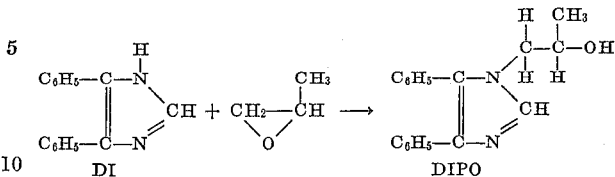

EXAMPLE 2

100 g. of 1,2-epoxy-2-methylbutane and 5 ml. of N-methylpiperidine or triethylamine are added to 580 ml. of 94% ethanol and 220 g. of DI is added and the mixture boiled weakly in a water bath. The boiling is continued for 1.5 hours with a refluxing condenser. DI is dissolved completely. The reaction solution is maintained for 10 hours at room temperature of 20° C., and colorless crystals of dl - 1 - (4',5'-diphenylimidazolyl)-2-ethyl-2-propanol, hereinafter referred to as DIPE crystalize out. The solution containing the crystals is filtered in a vacuum filter and the crystals, which are separated, are washed with cold 40% ethanol, and then dried at room temperature of 20° C., yielding 200 g. of the crystals (A). They have a melting point of 146° C. To 500 ml. of the filtrate in the vacuum filter, 100 ml. of water is added and maintained for 10 hours at room temperature of 20° C. yielding 20 g. of crystals (B). The melting point of the crystals (B) is lower than that of the crystals (A). From the said crystals the pure crystals with a melting point of 148–149° C. are obtained by the purifying method described in the Example 1. The following is an elementary analysis of $C_{20}H_{22}ON$:

Calculated (percent): C, 78.40; H, 7.24; N, 9.14. Experimental (percent): C, 78.21; H, 7.40; N, 9.40.
The result is shown as follows:

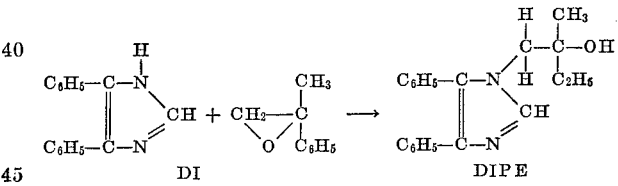

EXAMPLE 3

To a two-necked flask, a refluxing condenser and a dripping funnel are attached. In this flask 200 ml. of ethanol, 70 g. of DI and 50 g. of 1-bromo-2-propanol are placed, and a solution of 20.9 g. caustic soda dissolved in 80 ml. of distilled water is dripped from the dripping funnel for about one hour under weak boiling in a water bath. The reaction solution is filtered in the hot state, and the filtrate is retained for 10 hours at room temperature of 20° C. and crystals of DIPO crystalize out. The crystals are filtered in a vacuum filter and washed with 40% ethanol, then washed with water throughout yielding 59 g. of crystals. They have a melting point of 152–160° C. To 140 ml. of the filtrate from which the crystals were separated, 50 ml. of water is added and maintained for 10 hours at room temperature of 20° C., yielding 5 g. of crystals. The said crystals are purified using the purifying method described in the Example 1 and pure crystals with a melting point of 167–168° C. are obtained. The result is shown as follows:

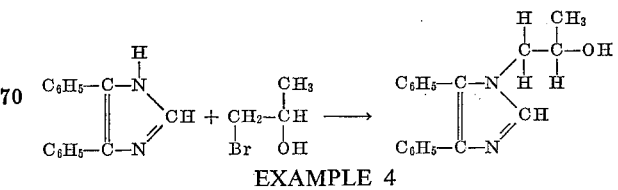

EXAMPLE 4

In Example 4, 46 g. of 1-chloro-2-methyl-2-butanol are used instead of 1-bromo-2-propanol, yielding 55 g. crystals of DIPE. The crystals have a lower melting point than that of the crystals (A) in the Example 2 and almost the same as that of the crystals (B). By treating the filtrate, from which the crystals were separated, in the same manner as in Example 3, an additional 5 g. of crystals are obtained. The pure crystals with a melting point of 148–149° C. are obtained by the purification of the said crystals using the purification method described in Example 1. The reaction results as follows:

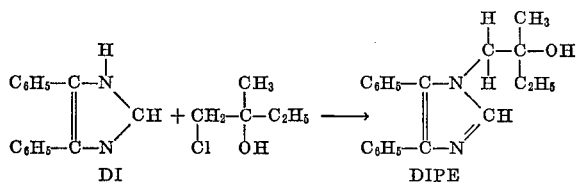

DI + ... → DIPE

The following table shows the solubility of DIPO:

SOLUBILITY OF DIPO

| Temperature | Substance, percent | | |
|---|---|---|---|
| | White soft paraffin | Liquid paraffin | Glycerin |
| 70°C.-100° C | Ca. 0.6 | Ca. 0.6 | Ca. 6.5 |
| 40°C | | Ca. 0.1 | Ca. 1.5 |

Having described my invention in a preferred form I desire it to be understood that changes and modifications may be made within the skill of the art and the scope of the appended claim.

I claim:
1. A derivative of 4,5-diphenylimidazole according to the following structural formula:

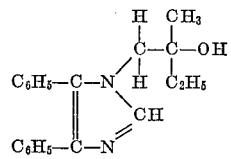

corresponding to dl-1-(4',5'-diphenylimidazolyl)-2-ethylpropanol.

References Cited

UNITED STATES PATENTS

| 2,944,061 | 7/1960 | Jacob et al. | 260—309 |
| 3,244,726 | 4/1966 | Karmas | 260—309 |
| 3,258,466 | 6/1966 | Kawakami | 260—309 |
| 3,280,139 | 10/1966 | Klosa | 260—309 |

OTHER REFERENCES

Jefferson Chemical Company, A Technical Bulletin on Ethylene Oxide, pp. 16–17, Houston, Jefferson Chemical Company.

HENRY R. JILES, Primary Examiner

N. TROUSOF, Assistant Examiner

U.S. Cl. X.R.
260—348, 633, 999